United States Patent [19]
Barnes et al.

[11] Patent Number: 5,551,052
[45] Date of Patent: Aug. 27, 1996

[54] DATA BUS PROTOCOL FOR HIGH SPEED CHIP TO CHIP DATA TRANSFER

[75] Inventors: Eric S. Barnes, Manhattan Beach; George L. Eldridge; Uoc Nguyen, both of Long Beach; Ajit Shah, Laguna Niguel; Ronald E. Weir, Torrance, all of Calif.

[73] Assignee: Xerox Corporation, Stamford, Conn.

[21] Appl. No.: 389,612

[22] Filed: Feb. 14, 1995

Related U.S. Application Data

[63] Continuation of Ser. No. 100,229, Aug. 2, 1993, abandoned.

[51] Int. Cl.⁶ .......................... G06F 9/46; G06F 13/362; G06F 13/42; G06F 13/40
[52] U.S. Cl. .................. 395/800; 364/240.8; 364/229.5; 364/229.2; 364/230.5; 364/231.7; 364/240.1; 364/256.8; 364/DIG. 1; 364/DIG. 2; 395/185.01
[58] Field of Search ........................ 395/800, 250, 395/275, 325, 200, 775, 500, 475, 375, 181, 185.01, 281, 306, 866.03, 883, 287, 489, 497.01, 285, 280, 200.08, 309; 364/DIG. 1, DIG. 2; 371/32, 68.1; 370/94.1, 95.3, 85.11; 340/825.5, 825.51

[56] References Cited

U.S. PATENT DOCUMENTS

| | | | |
|---|---|---|---|
| 4,719,621 | 1/1988 | May | 370/94.1 |
| 4,805,137 | 2/1989 | Grant et al. | 395/325 |
| 4,992,956 | 2/1991 | Kaku et al. | 395/114 |
| 5,131,081 | 7/1992 | MacKenna et al. | 395/275 |
| 5,179,530 | 1/1993 | Genusov et al. | 395/800 |
| 5,243,238 | 9/1993 | Kean | 307/465 |
| 5,367,643 | 11/1994 | Chang et al. | 395/325 |

*Primary Examiner*—Daniel Pan
*Attorney, Agent, or Firm*—Robert Cunha

[57] ABSTRACT

A protocol for communication through a bus controller to control data transfers between a host processing platform and the data bus of a bit map printer. This protocol is optimized for a data bus which connects a number of ASIC accelerator cards in addition to the printer, disk controller, bus controller and other typical system cards. The basic data transfer cycle transfers eight data words on the bus between ASIC's, I/O devices, printer and any other devices.

1 Claim, 3 Drawing Sheets

5,551,052

DATA BUS PROTOCOL FOR HIGH SPEED CHIP TO CHIP DATA TRANSFER

This is a continuation of application Ser. No. 08/100,229, filed Aug. 2, 1993, now abandoned.

BACKGROUND OF THE INVENTION

A data bus protocol adapted for controlling devices on a data bus between a host processing platform and a bit map printer for effectively transferring image data between the various image handling devices, the protocol comprising command instructions from a bus controller to the devices for specifying the data transfer path and timing, and transfer instructions for initiating the actual transfer.

A printing system may consist of nothing more than an off-the-shelf terminal and a bit map printer, but the printing speed will be low because some functions, such as compression, decompression, scaling, rotation and character generation are performed slowly in software A standard way of speeding up this kind of process is to do the most time-consuming processes in hardware, typically in ASICs, devices specially designed for the process, which run considerably faster than the equivalent software. These could be mounted on an additional board in the terminal but the terminal data bus does not have the bandwidth to handle these image handling processes at high printer speeds. Special purpose printer controllers could be built, but they are more expensive than the equivalent commercial terminals. Thus, there would be a significant cost benefit if commercial terminals could be adapted to high speed image printing.

SUMMARY OF THE INVENTION

This invention allows the use of a standard host processing platform by supplying the additional ASIC's board with its own data bus which communicates with the host processing platform bus interface, the printer interface, a scanner interface, an image disk drive, accelerator cards, and a bus controller which has its own processor and memory. The associated protocol includes a one-word command to any device with instructions on an upcoming data transfer, and an, I/O to I/O command which initiates an eight word data transfer between ASIC's or I/O devices.

DETAILED DESCRIPTION OF THE INVENTION

Figure 1:
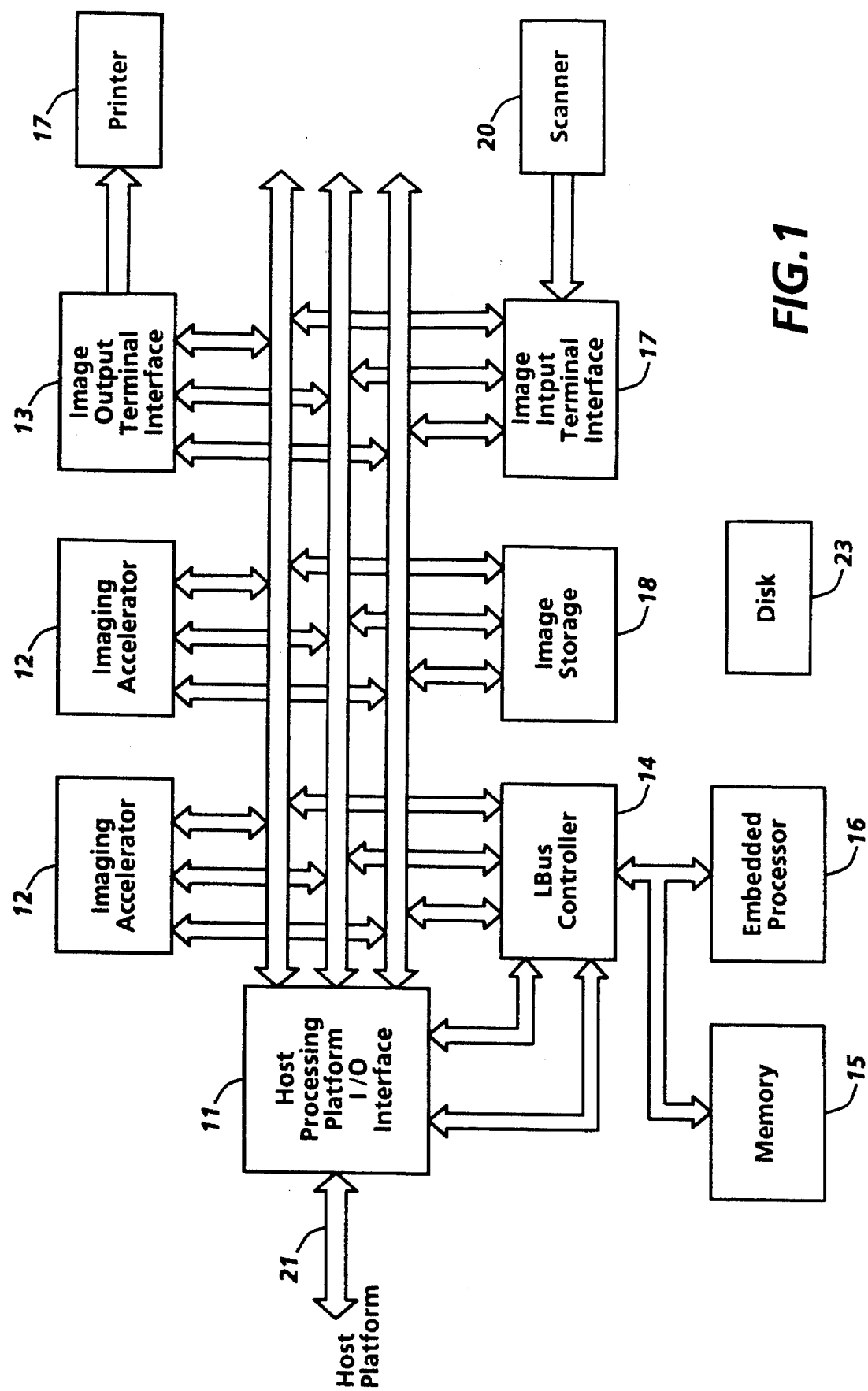
FIG. 1 is a block diagram of the system.

FIG. 1 is an overall view of the additional board, which consists of a data bus 22 and a number of devices, which connect a host processing platform I/O interface bus 21 to a printer 19 to enable the high speed printing of pages having both text and images in the form of graphics or scanned-in pictures.

The host processing platform I/O interface bus 21 can be connected directly to the printer 19, but many functions, such as compression, decompression, scaling and character image generation are performed slowly by the software in a host processing platform, and high speed printing on the order of 120 pages per minute requires that these functions be performed in special purpose hardware, connected by data bus 22.

The bus 22 connects through an image storage device 18 to a disk 23, through the image input terminal interface 17 to an input scanner 20, and through an Image output terminal interface 13 to a printer 19. In addition there are one or two imaging accelerators 12 which rapidly perform in hardware what would have been performed more slowly in software, such as image compression and scaling. The bus 22 is controlled by the bus controller 14, which has its own processor 16 and memory 15. Finally, the bus 22 is connected to the host bus 21 through the host processing platform I/O interface 11.

More specifically, the host platform interface 11 connects the bus 22 to the host processing platform through the host processing platform's native I/O bus interface bus. In this embodiment, the host processing platform is a Sun Microsystems Computer Corp. SPARCstation. The SPARCstation's native I/O interface bus is the "Sbus". Other host processing platforms (and native I/O interface busses) would work as well. Image data and control information passes to and from the host processing platform via the interface.

Imaging accelerator ASIC's are connected to the bus 22. These accelerators receive image data from the bus, process the data according to the function of the particular accelerator, and send the modified image back onto the bus.

Image data on the bus can originate from the host processing platform, image interface terminal interface or image storage. The destination of the image data can be the host processing platform, image output terminal interface, or image storage. In passing from the source to the destination the image may optionally pass through an imaging accelerator of any kind.

The movement of data across the bus is coordinated by the bus controller 14. This controller drives the control and address lines of the bus; receives the request for data transfer from the imaging accelerators, host bus interface, image storage and I/O devices; arbitrates the request and gives the highest priority request a grant to perform a data transfer on the bus and drives the address and control lines to notify the device sourcing the data and the device sinking the data so that the transfer can take place. During the data transfer the bus arbitrates the remaining requests to determine which devices will be granted use of the bus next.

Programming of the registers in the bus controller and the imaging accelerators is done with an embedded processor 16. The current implementation uses an AMD 29200, but any embedded processor could be used. Attached to the embedded processor is a memory 15 for stored programs and data.

The embedded processor does not reside on the bus. Instead, it performs all bus accesses through the controller 14. The controller is responsible for the cycle-by-cycle control of the bus. The embedded processor is responsible for overall control of the data transfers. This includes initializing devices, programming the source and destinations for image data transfers, setting the priorities for the transfers and performing cleanup after the transfers are complete.

The bus topology offers a number of important advantages for image manipulation applications. Placing the image accelerators and I/O interface devices on the same bus allows direct transfer of image data from one to the other. This reduces latency and increases throughput.

Separating the embedded processor from the bus 22 by the controller 14 eliminates embedded processor memory access traffic from the bus. This reduces bus latency and increases bus throughput, but it increases the latency for access by the embedded process to the registers in the imaging accelerators. The drawbacks are outweighed by the improvement in image data transfer since access to the imaging accelerator registers is infrequent compared to image data transfer.

The separation of the embedded processor from the bus also makes it easy to change the embedded processor to a different family of processors. The change of the embedded processor affects only the controller and not the interface of the imaging accelerator devices.

The bus is unlike many busses in that it does not support random access memory attached directly to the bus. The number of address bits is limited and is only sufficient to address the registers in the imaging accelerators and interfaces. Most image data does not have any address information associated with it. If address information must accompany an image, then it is sent as data.

The bus is a CMOS bus using TTL voltage levels. The bus has 32 bits of data and 10 bits of address. The address is a byte address; however, the minimum transfer size is one word (32 bits).

The bus supports two kinds of bus cycles, single word transfers and eight-word transfers. All single-word transfers are to or from the embedded processor. A single-word transfer begins with the embedded processor presenting an address to the controller. The controller will wait until the bus is available and then begin the single-word transfer. The address lines will be driven with the address and one device will have its chip select activated. A single word is either written to or read from the selected bus device.

With respect to eight-word burst transfers, when the bus has received requests from both a read device and a write device for a burst transfer between the devices and the bus is free, then the controller will initiate an ID cycle. The ID cycle lasts for exactly one clock cycle. The burst transfer cycle immediately follows the ID cycle. The burst transfer is exactly eight cycles. One word is transferred on each clock cycle.

An eight-word burst transfer reduces overhead and increases throughput, providing the best balance between the efficiency of large bursts with the FIFO size requirement in each bus device. As the packet size increases, the overhead from the address cycle becomes a smaller percentage of time spent per bus cycle. The disadvantage with very large packet sizes being transferred between ASIC's is that the input and output FIFO's become very large, increasing the cost of the ASIC's. In this invention the word size is 4 bytes and all burst transfers are 8 words. If an image is not a multiple of eight words, then the last packet must be padded to fill the entire eight words. The destination device has the responsibility of separating the padding bytes from the data bytes. The protocol does not include any flags or indicators to mark padding bytes.

The particular embodiment described here has a 32 bit data path and a number of associated control lines, to be discussed below, runs at a clock speed of 16.7 to 25 MHz, is completely synchronous, can handle bursts transfers of data, is compatible with CMOS components, and has a bandwidth of 88M bytes/sec to enable a printing speed of 120 pages per minute, each page containing 4M bytes of data.

The bus is optimized for CMOS devices using TTL compatible voltage levels, but is not compatible with bipolar devices. It is a chip-level bus, and so the length and loading of the bus is limited.

The bus is a packet (burst) bus. Burst data transfers across the bus consist of an ID cycle followed by a burst transfer cycle. Exactly eight words are transferred in each packet. This is necessary to get the high throughput required of the bus. All devices on the bus use burst transfers for moving data.

The bus should be considered a local bus for device interconnect, and therefore does not use parity. It is recommended that the bus devices interfacing to dynamic memory generate and check the parity of the data in the dynamic memory before placing it in the bus.

The protocol requires two kinds of commands to enable one bulk data transfer, a write or read access cycle and a data transfer cycle. The write cycle writes data from the controller to a device, the read cycle writes data from the device to the controller. In a transfer to a device, the original and final locations of the data to be sent must be identified. Since there is a receiving and transmitting device, at least two access commands are required to set up each bulk data transfer.

Figure 2:
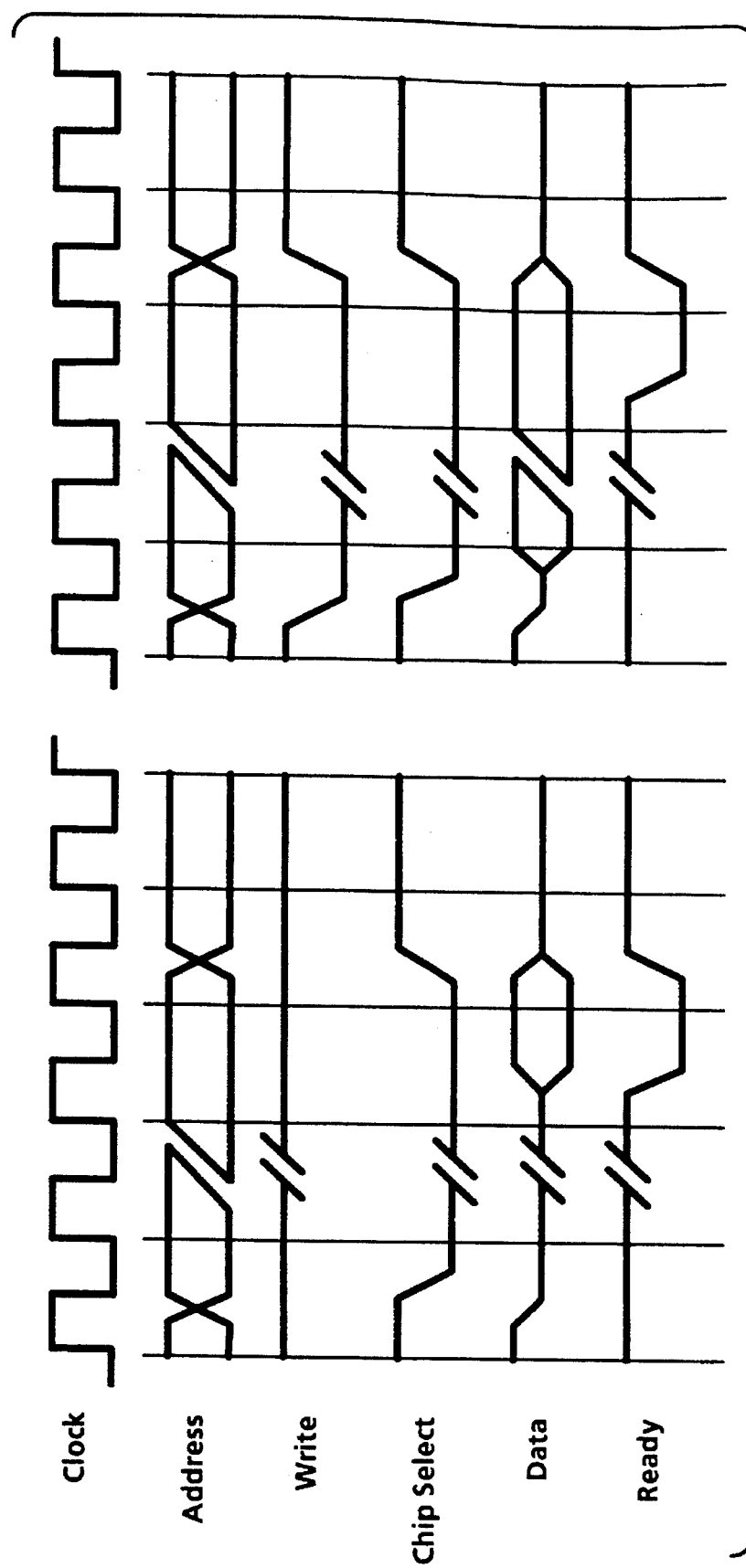
FIG. 2 is a timing diagram of the access cycle.

A write access cycle, as shown in FIG. 2, begins with the processor presenting an address for accessing to the bus controller. The address comprises the chip address, the buffer address in the selected device, and the location of the data in the buffer. The controller will enter the request into the arbitration pool for the bus. When the bus becomes available the controller will process the highest priority request as follows.

The processor will present to the controller an address of a chip. If the address matches a programmed ship select line in the controller, then the controller will put the chip select data on the chip select lines, and set the write, or transfer direction, line. Also, the controller will place the data from the processor onto the data lines. The controller will then wait until the writing of data has been completed, either by waiting a predetermined time period or waiting until the ready line is asserted. If a device fails to respond after 256 clocks, it is considered a timeout and the controller will terminate the bus cycle. At the conclusion of the cycle, the controller will reset the write line and chip select lines, and become ready to receive another command from the processor. The read cycle is the same except that the write line is not asserted and the data moves from the selected device to the processor.

Figure 3:
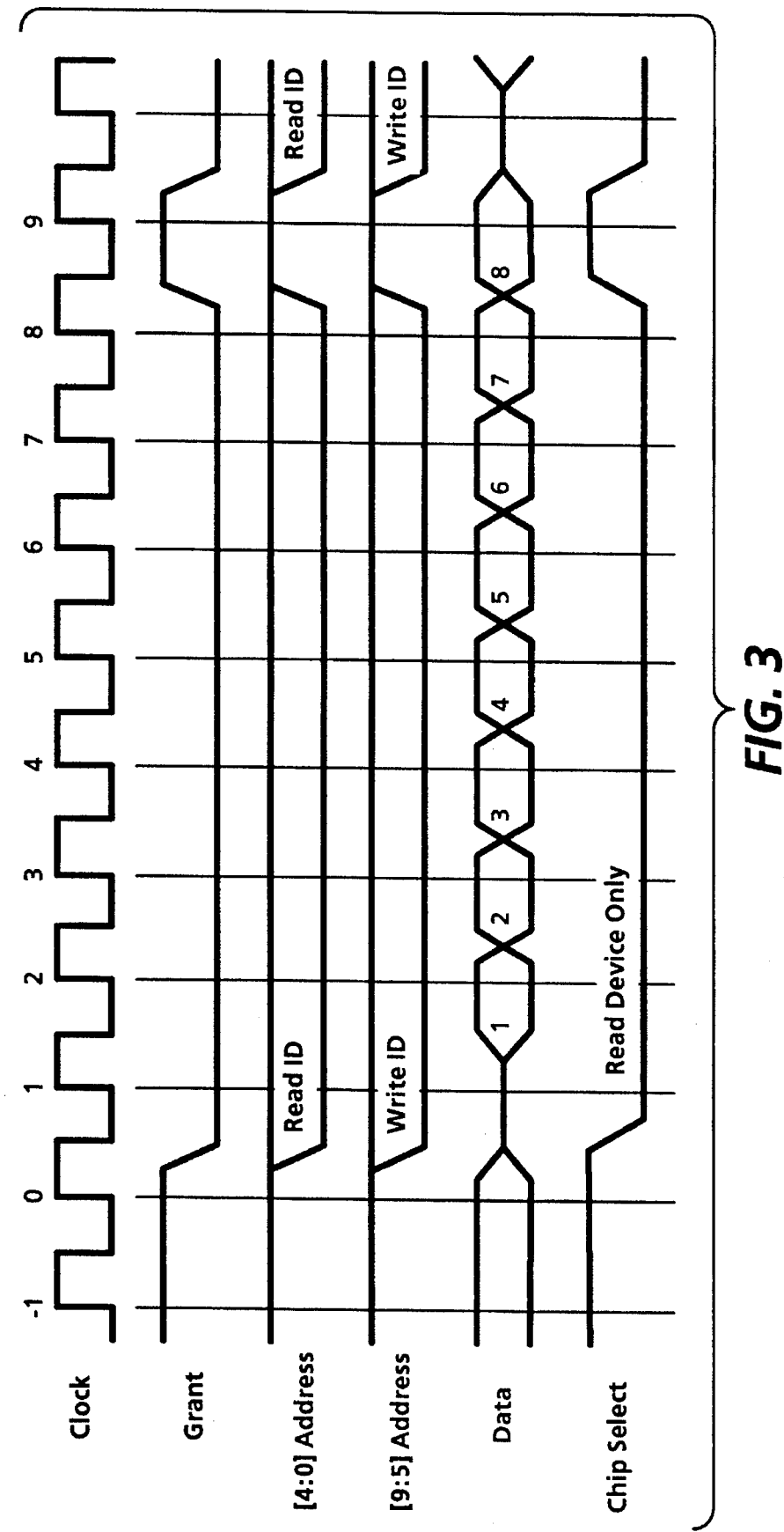
FIG. 3 is a timing diagram of the data transfer cycle.

A data transfer cycle, as shown in FIG. 3, is for the transfer of data directly from one device to another, and has two parts: the ID cycle and the burst transfer cycle.

For an ID cycle, when the controller has received requests from both a read device and a write device for a transfer between the devices, and the bus is free, the controller will initiate the ID cycle, which lasts for exactly one clock cycle. First, the controller will assert the bus grant line, also referred to as the common DMA acknowledge line, which is monitored by all bus devices except the host platform interface. Next the controller will put a five bit address on the address lines identifying the read device, and another five bit address for the write device. When a device detects that the grant line is asserted, it will compare the read and write ID's to its own. If there is a match, then the device has been granted access to the bus. It must then begin a burst transfer. The read device will also receive the chip select. Only the device receiving the chip select may drive the bus. This prevents bus contention caused by incorrect programming of the bus devices. The host platform interface uses a different protocol for burst transfer.

The burst transfer automatically follows the ID cycle on the next clock, and lasts exactly eight cycles, one word on each cycle.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

We claim:

1. A process of transferring a number n of packets of data from a read chip having an address to a write chip having an address connected by a data bus having data lines, address lines and a grant line, said process being controlled by a bus controller, said read chip generating a read request signal and said write chip generating a write request signal, comprising steps of:

a. writing into a read chip said number n and a read chip address, and instructing said read chip to begin said transfer by issuing a read request signal, b. writing into a write chip said number n and a write chip address, and instructing said write chip to begin said transfer by issuing a write request signal, c. In response to receiving by the controller both of said read and write request signals, placing, by the controller, the read and write chip addresses on said address lines at the same time, and activating a grant signal on said grant line, d. upon receiving the grant signal, if the read chip is addressed by the read chip address on the address lines, driving data onto the data lines of said data bus from said read chip until a packet is completely transmitted, e. upon receiving the grant signal, if the write chip is addressed by the write chip address on the address lines, receiving data from the data lines of said data bus by said write chip until the packet is completely received, f. both chips, after the packet transfer is complete, removing the request signal and waiting until both read and write chips are ready to perform another packet transfer, g. both read and write chips issuing request signals, and h. repeating steps c through g until the transfer of said number n of packets is complete.

\* \* \* \* \*